(12) United States Patent
Engel et al.

(10) Patent No.: US 7,296,085 B2
(45) Date of Patent: Nov. 13, 2007

(54) MULTIPLE PROTOCOL HANDSHAKING BETWEEN SYSTEMS

(75) Inventors: Andy Engel, Portola Valley, CA (US);
Janet L. Yun, Santa Clara, CA (US);
Allan Liu, Oakland, CA (US); Marty Lynn Pflum, Austin, TX (US); Robert Thomas Grisamore, Austin, TX (US)

(73) Assignee: Avago Technologies Fiber IP (Singapore) Pte Ltd, Singapore (SG)

( * ) Notice: Subject to any disclaimer, the term of this patent is extended or adjusted under 35 U.S.C. 154(b) by 618 days.

(21) Appl. No.: 10/205,773

(22) Filed: Jul. 26, 2002

(65) Prior Publication Data

US 2004/0019694 A1    Jan. 29, 2004

(51) Int. Cl.
*G06F 15/16* (2006.01)
(52) U.S. Cl. .................. 709/237; 709/250; 375/220
(58) Field of Classification Search ........... 709/237, 709/250
See application file for complete search history.

(56) References Cited

U.S. PATENT DOCUMENTS

| | | | | |
|---|---|---|---|---|
| 4,884,266 | A | * | 11/1989 | Pflaumer ................ 370/545 |
| 4,908,823 | A | * | 3/1990 | Haagens et al. ........... 370/464 |
| 5,535,373 | A | * | 7/1996 | Olnowich ................ 703/25 |
| 5,930,685 | A | * | 7/1999 | Straub .................. 455/72 |
| 2001/0043603 | A1 | * | 11/2001 | Yu .................... 370/393 |

OTHER PUBLICATIONS

A. Udaya Shankar and David Lee, "Minimum-Latency Transport Protocol with Modulo-N Incarnation Numbers", IEEE/ACM, Transactions on Networking, vol. 3, No. 3, Jun. 1995.*

John Postel, "Transmission Control Protocol", 1981, Information Sciences Institute University of Southern California, RFC 793, pp. 5 and 31.*

IEEE Std 802.2, Part 3: Carrier sense multiple access with collision detection (CSMA/CD) access method and physical layer specifications, 2000 Edition, Chapter 28 excerpt (pp. 698-707), Chapter 36 excerpt (pp. 962-965), Chapter 37 excerpt (pp. 1009-1014), Chapter 40 excerpt (pp. 1078-1084).

IEEE Std 802.2, Part 3: Carrier sense multiple access with collision detection (CSMA/CD) access method and physical layer specifications, 2000 Edition, Chapter 28 excerpt (pp. 698-707), Chapter 36 excerpt (pp. 962-965), Chapter 37 excerpt (pp. 1009-1014), Chapter 40 excerpt (pp. 1078-1084), date unknown.

* cited by examiner

*Primary Examiner*—Andrew Caldwell
*Assistant Examiner*—Bradford F. Fritz

(57) ABSTRACT

Handshaking is performed between a first host system and a second host system. First handshaking is performed between a host module within the first host system and a first transceiver within the first host system. The first handshaking includes passing from the first transceiver to the host module dummy information about the second host system. Second handshaking is performed between a second transceiver within the second host system and the first transceiver. The second handshaking includes obtaining, by the first transceiver from the second transceiver, first information about the second host system. Handshaking between the host module and the first transceiver is restarted. This includes passing from the first transceiver to the host module the first information about the second host system. The first information replaces the dummy information passed from the first transceiver to the host module during the first handshaking.

24 Claims, 5 Drawing Sheets

MULTIPLE PROTOCOL HANDSHAKING BETWEEN SYSTEMS

BACKGROUND

The present invention pertains to networking systems and pertains particularly to multiple protocol handshaking between systems.

When two host systems are communicating via a cable, each host system typically includes a transceiver that converts electrical signals received from the host system to signals that are suitable for the cable. Each transceiver also converts signals received from the cable to electrical signals usable by the host system. Generally, the transceiver can convert the signals one bit at a time or the transceiver can encode/decode the signals. In addition, the transceiver can be an electro-optic transceiver (which converts electrical signals to optical signals and vice versa) or an electrical transceiver (which converts electrical signals of one format to another format and vice versa). Typically, the "one bit at a time" transceiver allows handshaking to occur directly between two host systems and the "encoding/decoding" transceiver does not. Typically, the electro-optic transceiver allows the use of a receiver status signal to be sent when a cable connection is detected and the electrical transceiver does not.

For example, in 1000BASE-X systems transceivers typically perform the conversion one bit at a time. The transceiver can be electro-optical or electrical in nature. When the transceiver is electro-optical, the two communicating systems are connected with a fiber optic cable. The electro-optic transceiver converts each bit in the electrical signal received from the host system to a bit in an optical signal to be sent across the fiber optic cable. Each electro-optic transceiver also converts optical signals received from the fiber optic cable to electrical signals used by the host system. When an electro-optic transceiver first receives light from a source at the other end of the fiber optic cable, the electro-optic transceiver updates its receiver status signal. When both electro-optic transceivers forward to their respective host systems a receiver status signal that indicates the reception of optical power the two host systems perform their handshaking protocol to establish a link.

Whenever a fiber optic cable link between two electro-optic transceivers is broken, each electro-optic transceiver changes its receiver status signal to indicate optical power is no longer being received. When the fiber optic cable link between two electro-optic transceivers is restored, each electro-optic transceiver changes its receiver status signal to indicate the reception of optical power and the systems again perform handshaking.

When two host systems are communicating via electrical (e.g., copper-based) cables, each host system typically includes an electrical transceiver that converts electrical signals in a format used by the host system to electrical signals in a format appropriate to be sent across the electrical cables. Each electrical transceiver also converts electrical signals received from the electrical cables to electrical signals in a format used by the host system. A typical 1000BASE-X transceiver converts data one bit at a time. Typically, in systems based on electrical cable, there is nothing equivalent to a receiver status signal that indicates the reception of optical power. This results in an incompatibility between protocols used between host systems using two electrical transceivers to exchange information over electrical cables and protocols used between host systems using two electro-optic transceivers to exchange information over a fiber optic cable.

If 1000BASE-X host systems are communicating and non-1000BASE-X transceivers that encode/decode data are used, then direct handshaking between the host systems is not possible. For example, if 1000BASE-T electrical transceivers are used in two communicating 1000BASE-X systems, the data from a host system is encoded by the 1000BASE-T transceiver and the special handshaking codes sent by the system are not passed through the 1000BASE-T transceiver. In addition, as in the case when a 1000BASE-X electrical transceiver is used, the receiver status signal does not exist when the 1000BASE-T electrical transceiver is used in the system.

For further information, see, for example, the IEEE Std. 802.3, 2000 Edition, Part 3: Carrier sense multiple access with collision detection (CSMA/CD) access method and physical layer specifications, Clause 36 and Clause 37, in which pertinent parts of the 1000BASE-X protocol are discussed, and Clause 40 and Clause 28, in which pertinent parts of the 1000BASE-T protocol are discussed.

SUMMARY OF THE INVENTION

In accordance with the preferred embodiment of the present invention, handshaking is performed between a first host system and a second host system. First handshaking is performed between a host module within the first host system and a first transceiver within the first host system. The first handshaking includes passing from the first transceiver to the host module dummy information about the second host system. Second handshaking is performed between a second transceiver within the second host system and the first transceiver. The second handshaking includes obtaining, by the first transceiver from the second transceiver, first information about the second host system. Handshaking between the host module and the first transceiver is restarted. This includes passing from the first transceiver to the host module the first information about the second host system. The first information replaces the dummy information passed from the first transceiver to the host module during the first handshaking.

DESCRIPTION OF THE PREFERRED EMBODIMENT

Figure 1:
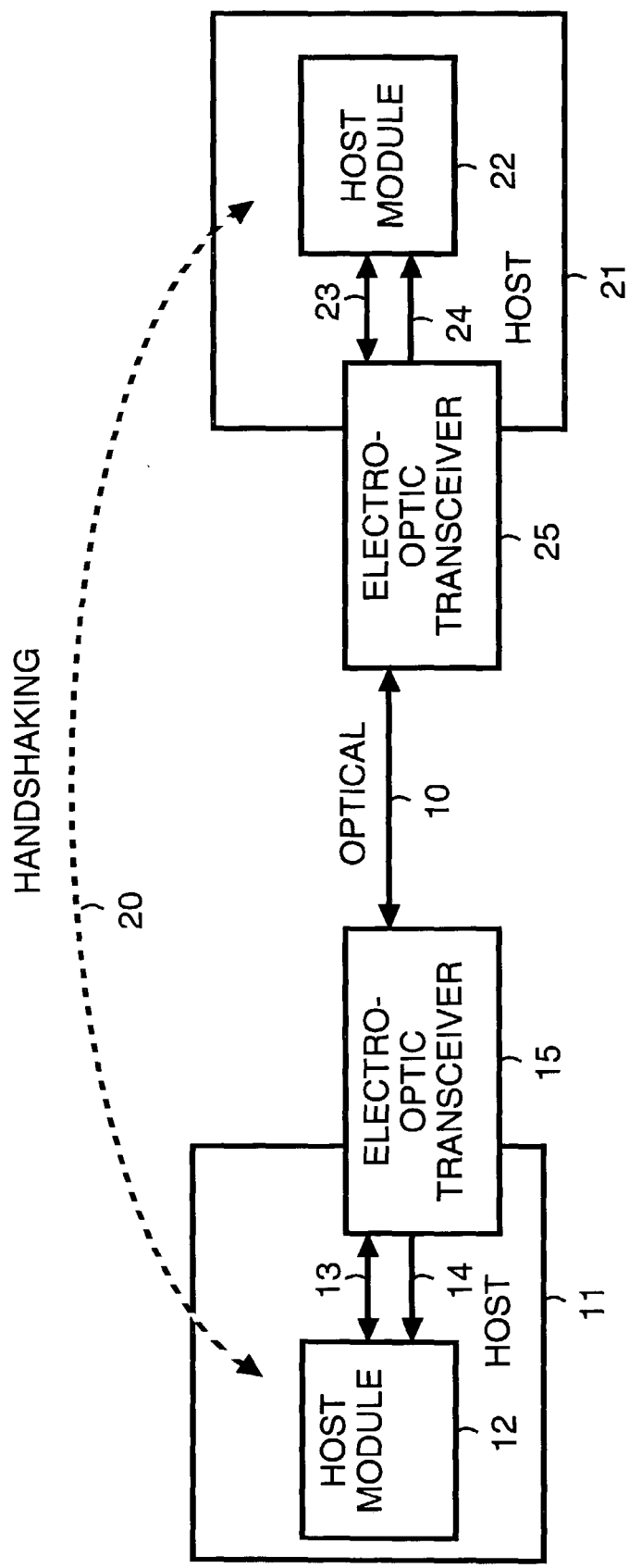
FIG. 1 is a simplified block diagram illustrating handshaking between two host systems adapted to electro-optic transmissions when each host system utilizes an electro-optic transceiver in accordance with the prior art.

FIG. 1 shows a host 11 that includes an electro-optic transceiver 15 and a host module 12 adapted to electro-optic transmissions. A data path 13 represents data transmissions between host module 12 and electro-optic transceiver 15. A receiver status signal 14 represents transmission of receiver status from electro-optic transceiver 15 to host module 12. For example, host module 12 and electro-optic transceiver 15 are adapted to use the 1000 BASE-X protocol.

A host 21 includes an electro-optic transceiver 25 and a host module 22 adapted to electro-optic transmissions. A data path 23 represents data transmissions between host module 22 and electro-optic transceiver 25. A receiver status signal 24 represents transmission of receiver status from electro-optic transceiver 25 to host module 22. For example, host module 22 and electro-optic transceiver 25 are adapted to use the 1000 BASE-X protocol.

Electro-optic transceiver 15 and electro-optic transceiver 25 are connected via a fiber optic cable link 10. When electro-optic transceiver 15 first detects light from fiber optic cable link 10, electro-optic transceiver 15 transmits the receiver status signal 14 to host module 12 indicating reception of optical power. Likewise, when electro-optic transceiver 25 first detects light from fiber optic cable link 10, electro-optic transceiver 25 transmits the receiver status signal 24 to host module 22 indicating reception of optical power. When each host module receives a receiver status transmission, handshaking 20 is performed between host module 12 and host module 22. Electro-optic transceiver 15 and electro-optic transceiver 25 serve as conduits of information during handshaking 20.

Figure 2:
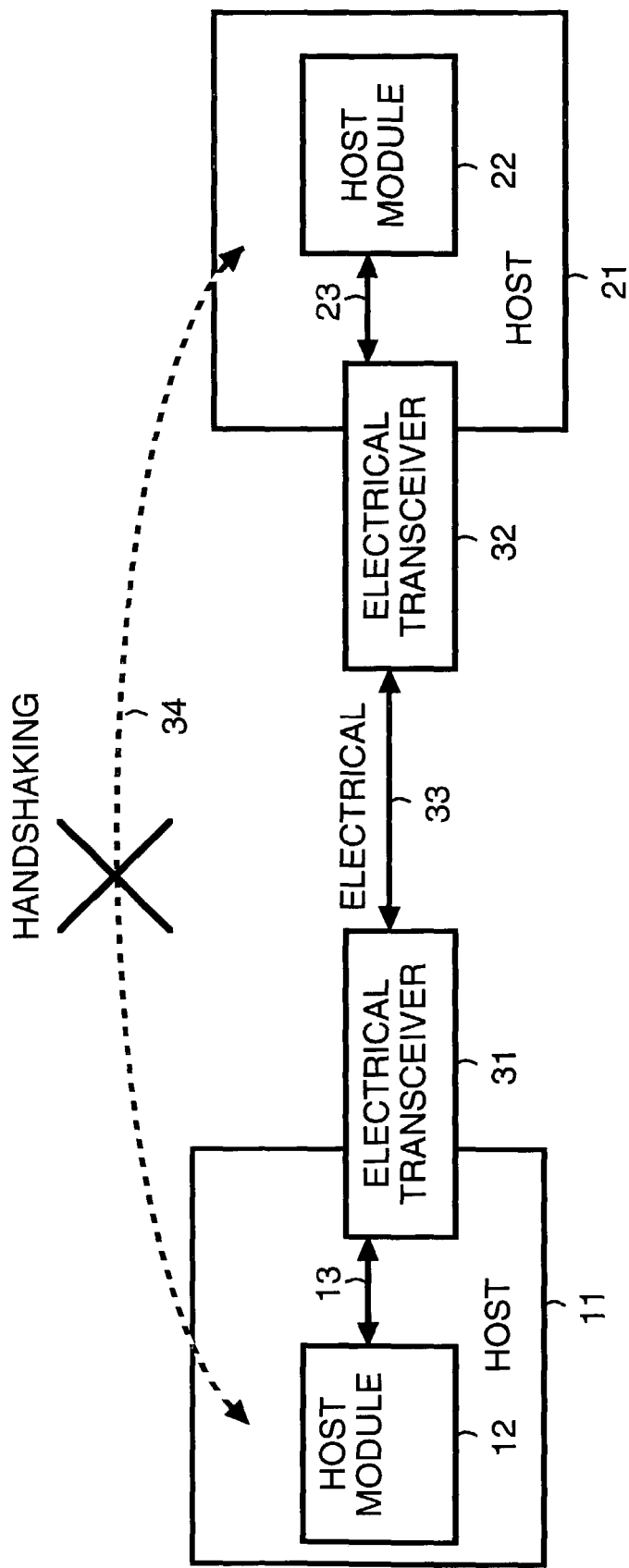
FIG. 2 is a simplified block diagram illustrating failure of handshaking between two host systems adapted to electro-optic transmissions when each host system utilizes an electrical transceiver.

FIG. 2 illustrates what occurs when fiber optic cable link 10 is replaced with an electrical cable link 33, when within host 11, electro-optic transceiver 15 is replaced by an electrical transceiver 31, and when within host 21, electro-optic transceiver 25 is replaced by an electrical transceiver 32. In electrical cable base systems there is nothing equivalent to a receiver status signal that indicates the reception of optical power. Therefore, electrical transceiver 31 never transmits a receiver status transmission to host module 12 indicating reception of optical power. Likewise, electrical transceiver 32 never transmits a receiver status transmission to host module 22 indicating reception of optical power. Handshaking 34, between host module 12 and host module 22 is never started and communication between host 11 and host 21 does not take place.

In the preferred embodiment of the present invention, the protocol under which a standard electrical transceiver operates is modified to allow for communication between host 11 and host 21 over an electrical cable link.

Figure 3:
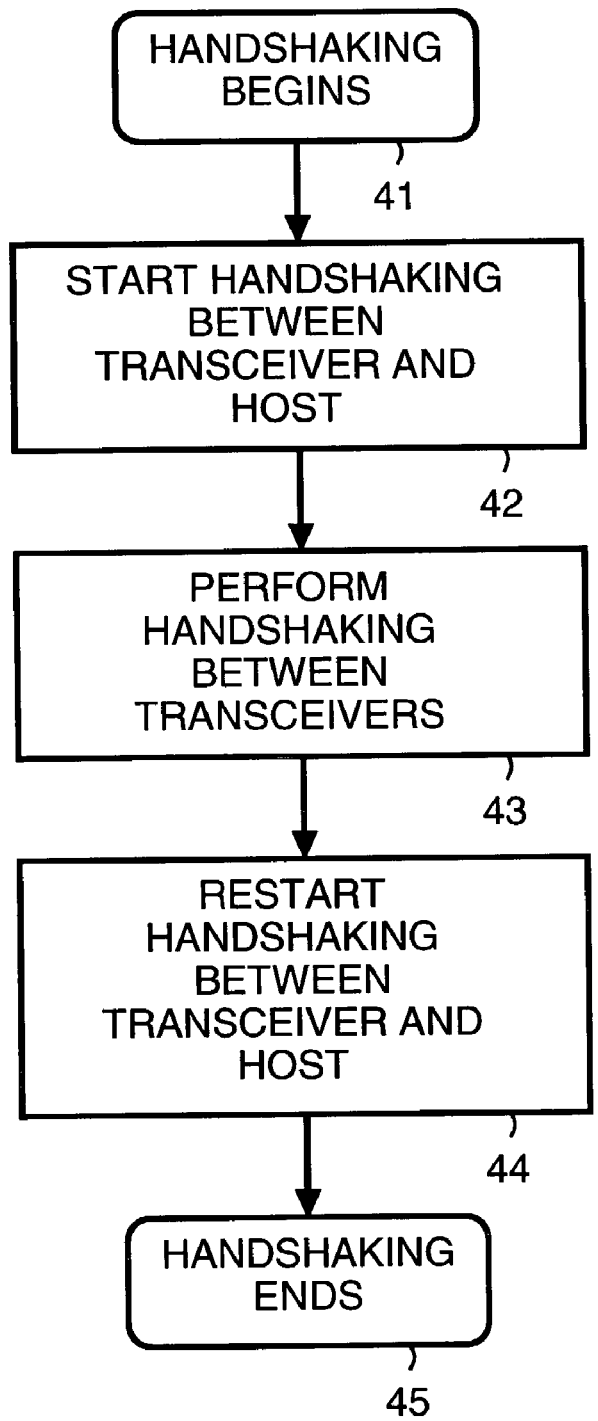
FIG. 3 is a flowchart illustrating operation of an electrical transceiver in order to allow handshaking between two host systems adapted to electro-optic transmissions in accordance with a preferred embodiment of the present invention.

For example, FIG. 3 shows a flowchart illustrating operation of an electrical transceiver that allows for communication between host 11 and host 21 over an electrical cable link. In a preferred embodiment, the operation uses a three-step handshaking process that establishes a link between two BASE-X hosts with BASE-T transceivers while maintaining the receiver status signal functionality. Modifications are made only to the electrical transceivers to accommodate the new handshaking process. The host modules remain unchanged and thus are unaware that they are performing handshaking across an electrical link rather than a fiber optic link.

Figure 4:
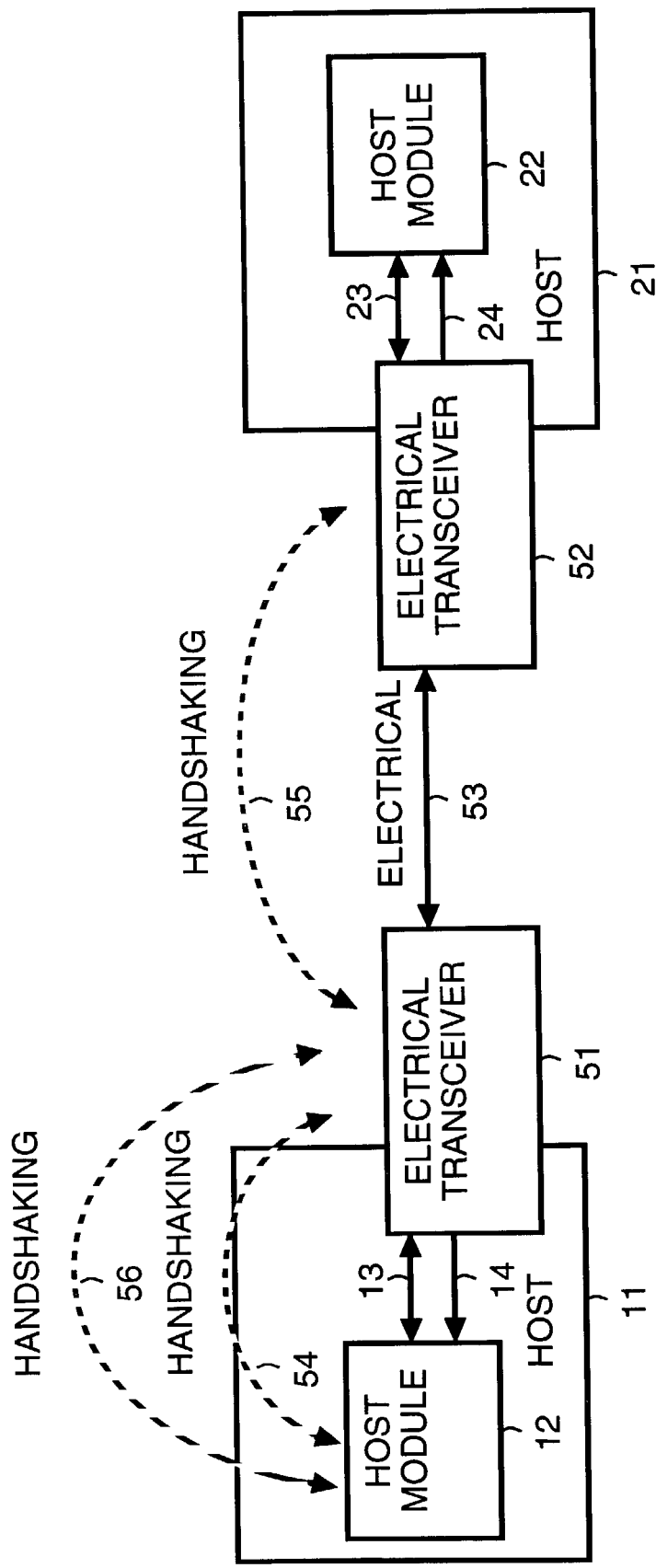
FIG. 4 is a simplified block diagram illustrating handshaking between two host systems adapted to electro-optic transmissions when each host system utilizes an electrical transceiver in accordance with a preferred embodiment of the present invention.

In a block 41 handshaking begins. In a block 42, handshaking is started between the transceiver and the host. This is illustrated in FIG. 4. FIG. 4 shows an electrical transceiver 51 placed within host 11, and an electrical transceiver 52 placed within host 21. Electrical transceiver 51 and electrical transceiver 52 are connected via an electrical cable link 53.

The starting of handshaking between the transceiver and the host is represented by handshaking 54 between host module 12 and an electrical transceiver 51. Handshaking 54 is initialized by electrical transceiver 51 transmitting the receiver status signal 14 to host module 12 indicating reception of optical power. This is a dummy transmission since electrical transceiver 51 is not connected to an optical fiber cable and does not detect reception of optical power.

The use of a dummy transmission allows initial initiation of a link and allows restoration of a link when recovering from a signal loss in an established link (e.g., caused by a cable being unplugged). After a predetermined amount of time after loss of signal, each electrical transceiver transmits a dummy receiver status signal 14 to its host indicating reception of optical power. The transmission of the dummy receiver status signal 14 causes the host module to be ready to begin handshaking. This allows handshaking 54 to begin between host module 12 and the electrical transceiver 51 after a link is disrupted. Further handshaking, however, will not be able to proceed until the link is restored.

In the preferred embodiment of the present invention, the functionality of the receiver status signal is maintained by the use of a single pulse with pre-determined width (i.e., the pre-determined amount of time after loss of signal). In the prior art, when an electro-optic transceiver is used, the pulse width is not pre-determined; rather, the pulse width is determined by the length of time between when optical power is lost and when optical power is once again sent into the electro-optic transceiver. In the preferred embodiment of the present invention, when an electrical transceiver is used, the receiver status signal will change to alert the host system that the link has been broken. After a pre-determined amount of time, the status signal is returned to its "link-established" state and the host module is thereby informed that the handshaking process must resume. The pulse width is determined by the length of time required by a given host module to react to the change in receiver status. Individual host modules might have different requirements, so in the preferred embodiment, the pulse width is programmable within the electrical transceiver.

During handshaking 54, electrical transceiver 51 obtains information from host module 12 that electrical transceiver 51 will need to perform handshaking with electrical transceiver 52. For example, when host module 12 and host module 22 operate in accordance with the 1000 Base-X protocol, electrical transceiver 51 obtains from host module 12 the FD (full duplex), HD (half duplex), PS1 (PAUSE), PS2 (ASM_DIR), RF (remote fault) bits from host module 12. These bits are passed in a word (or collection of bits) called a "configuration register base page" or "config_reg base page". For example, electrical transceiver 51 passes to host module 12 dummy values for these bits pertaining to host module 22 in order to perform handshaking 54.

After obtaining from host module 12 the information which electrical transceiver 51 will need to perform handshaking with electrical transceiver 52, electrical transceiver suspends handshaking with host module 12. For example, when host module 12 operates in accordance with the 1000

Base-X protocol, electrical transceiver 52 holds host module 12 in the idle_detect state while further handshaking (autonegotiation) proceeds.

In a block 43 (shown in FIG. 3) handshaking between transceivers is performed. This is represented in FIG. 4 by handshaking 55. During the handshaking between the electrical transceivers, the transceivers agree on settings for optimal communication. In addition, the electrical transceivers share the information that they obtained from their respective host modules during the handshaking performed in block 42. For example, when the host modules operate in accordance with the 1000 Base-X protocol, the information obtained from the host modules is composed of the FD (full duplex), HD (half duplex), PS1 (PAUSE), PS2 (ASM_DIR), RF (remote fault) bits.

For example, when electrical transceiver 51 and electrical transceiver 52 operate in accordance with the 1000 Base-T protocol, the values of the FD, HD, PS1 and PS2 bits are used as the "local" values during Clause 28 autonegotiation (handshaking 55). PS1 and PS2 are sent in bits of the clause 28 auto-negotiation "page 1". FD (Clause 28 1000FDX) and HD (Clause 28 1000HDX) are sent in bits of the clause 28 auto-negotiation "base pages/next pages". Clause 37 logic does not implement next pages, which are only used in clause 28 logic for 1000Base-T. Conflicts in the pause encoding and/or the duplex status are resolved as in IEEE802.3:2000, annex 28B, and the resulting values of these 4 bits are carried to the next auto-negotiation. The Clause 28 auto-negotiation also determines which module is the master and which is the slave.

Once handshaking 55 is completed, in a block 44 (shown in FIG. 3), the electrical transceivers restart the traditional electro-optical handshaking with the host modules. This is represented in FIG. 4 by handshaking 56. Handshaking 54 is terminated. In handshaking 56, electrical transceiver 51 passes the actual information regarding host module 22 that electrical transceiver 51 received during handshaking 55. Electrical transceiver 51 allows the handshaking with host module 22 to complete, thereby establishing the link with common settings at each end of the electrical cable link 53.

For example, when host module 12 and host module 22 operate in accordance with the 1000 Base-X protocol, during handshaking 56, the config_reg base page electrical transceiver 51 receives from host module 12 is checked against the config_reg base page which electrical transceiver 51 received from host module 12 during handshaking 54. If no difference is detected, then the bit values resulting from the resolution of handshaking 56 are placed into bits of a register in the host module and data is sent and received according to the protocol specified by these bits.

If the config_reg base page which electrical transceiver 51 received from host module 12 during handshaking 56 is different than the config_reg base page which electrical transceiver 51 received from host module 12 during handshaking 54, electrical transceiver 51 will force the entire handshaking process to start again, beginning with handshaking 54.

Figure 5:
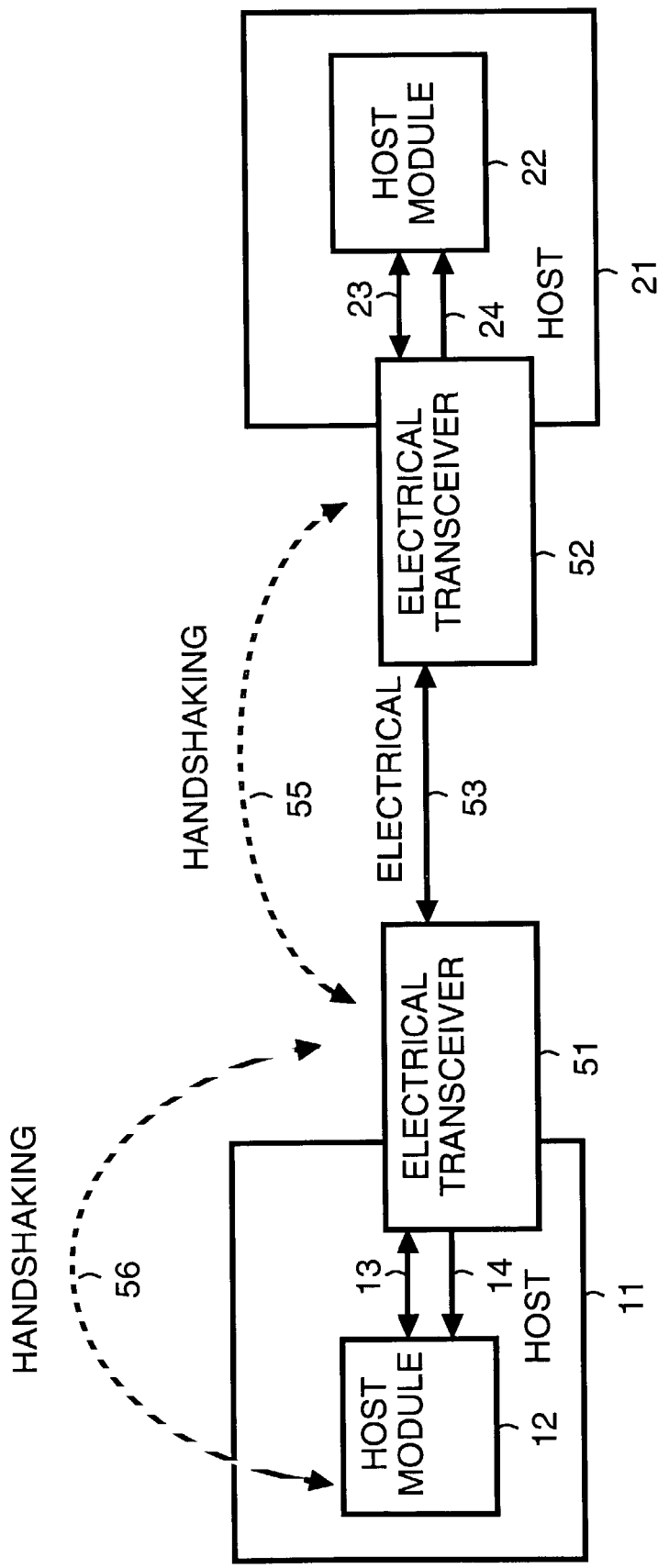
FIG. 5 is a simplified block diagram illustrating handshaking between two host systems adapted to electro-optic transmissions when each host system utilizes an electrical transceiver and a first handshaking is not performed in accordance with a preferred embodiment of the present invention.

In an alternative embodiment of the present invention, handshaking 54 can be disabled provided the electrical transceivers can obtain necessary information to perform handshaking 55 and handshaking 56 without performing handshaking 54. This is illustrated in FIG. 5, where handshaking 54 is eliminated from the initialization process.

For example, when host module 12 and host module 22 operate in accordance with the 1000 Base-X protocol, during handshaking 55 (e.g., a clause 28 auto-negotiation), each electrical transceiver obtains the local values for PS1, PS2, FD and HD from values previously stored in registers within the electrical transceiver.

When handshaking 54 is disabled, a preferred embodiment allows the option to set RX-LOS to be the opposite of link_status. In this case, the receiver status can reflect the actual status of the link.

The present invention provides for assurance of link establishment when electrical transceivers are used in a system that was originally designed for electro-optic transceivers an when encoding/decoding transceivers are used in a system that was originally designed for transceivers that pass data bit for bit. In addition, improved system performance and integrity is achieved by providing expected acknowledgment of signal loss and acquisition to the system when electrical transceivers are used in a system that was originally designed for electro-optic transceivers.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for performing handshaking between a first host system and a second host system, the method comprising the followings steps:
    (a) performing first handshaking between a host module within the first host system and a first transceiver within the first host system, including the following substeps:
        (a.1) passing from the first transceiver to the host module dummy handshaking information about the second host system, wherein the host module expects to receive true handshaking information about the second host system, but the first transceiver not having the true handshaking information about the first host system sends the dummy handshaking information instead, the dummy handshaking information being information that is not the true handshaking information about the first host system;
        (a.2) suspending the first handshaking after the first transceiver obtains from the host module true handshaking information about the first host system;
    (b) performing second handshaking between a second transceiver within the second host system and the first transceiver, including the following substep:
        (b.1) obtaining, by the first transceiver from the second transceiver, the true handshaking information about the second host system; and,
    (c) restarting handshaking between the host module and the first transceiver, including the following substep:
        (c.1) passing from the first transceiver to the host module the true handshaking information about the second host system, the true handshaking information replacing the dummy handshaking information passed from the first transceiver to the host module during the first handshaking.

2. A method as in claim 1 wherein in step (a) the first handshaking is performed in accordance with 1000 Base-X protocol.

3. A method as in claim 1 wherein in step (a) the first handshaking is initiated by the first transceiver sending a receiver status signal to the host module.

4. A method as in claim 1 wherein in step (b) the second handshaking is performed in accordance with 1000 Base-T protocol.

5. A method for performing handshaking within a first host system, the method comprising the followings steps:
- (a) performing first handshaking between a host module within the first host system and a first transceiver within the first host system, including the following substeps:
  - (a.1) passing from the first transceiver to the host module dummy handshaking information about a second host system, wherein the host module expects to receive true handshaking information about the second host system, but the first transceiver not having the true handshaking information sends the dummy handshaking information instead, the dummy handshaking information being information that is not the true handshaking information;
  - (a.2) suspending the first handshaking after the first transceiver obtains from the host module true handshaking information about the first host system;
- (b) performing second handshaking between a second transceiver within the second host system and the first transceiver, including the following substep:
  - (b.1) obtaining, by the first transceiver from the second transceiver, the true handshaking information about the second host system; and,
- (c) passing from the first transceiver to the host module the true handshaking information about the second host system, the true handshaking information replacing the dummy handshaking information passed from the first transceiver to the host module during the first handshaking.

6. A method as in claim 1 wherein said performing second handshaking further includes the following substep:
- (b.2) sending, from the first transceiver to the second transceiver, the true handshaking information about the first host system.

7. A method as in claim 1 wherein said dummy handshaking information about the second host system is selected from the group consisting of FD (full duplex), HD (half duplex), PS1 (Pause), PS2 (ASM_DIR), and RF (remote fault) bits about the second host system.

8. A method as in claim 5 wherein in step (a) the first handshaking is performed in accordance with 1000 Base-X protocol.

9. A method as in claim 5 wherein in step (a) the first handshaking is initiated by the first transceiver sending a receiver status signal to the host module.

10. A method as in claim 5 wherein the true handshaking information is passed from the first transceiver to the host module during performance of second handshaking in accordance with 1000 Base-T protocol.

11. A method as in claim 5 wherein said performing second handshaking further includes the following substep:
- (b.2) sending, from the first transceiver to the second transceiver, the true handshaking information about the first host system.

12. A method as in claim 5 wherein said dummy handshaking information about the second host system is selected from the group consisting of FD (full duplex), HD (half duplex), PS1 (Pause), PS2 (ASM_DIR), and RF (remote fault) bits about the second host system.

13. A host system comprising:
- a host module; and,
- a first transceiver;
- wherein the first transceiver performs first handshaking with the host module in which the first transceiver passes to the host module dummy handshaking information about a second host system, wherein the host module expects to receive true handshaking information about the second host system, but the first transceiver not having the true handshaking information sends the dummy handshaking information instead, the dummy handshaking information being information that is not the true handshaking information;
- wherein the first transceiver suspends the first handshaking after the first transceiver obtains from the host module true handshaking information about the first host system;
- wherein the first transceiver performs second handshaking with a second transceiver within the second host system in which the first transceiver obtains from the second transceiver true handshaking information about the second host system; and,
- wherein the first transceiver restarts handshaking with the host module in which the first transceiver passes to the host module the true handshaking information about the second host system, the true handshaking information replacing the dummy handshaking information passed from the first transceiver to the host module during the first handshaking.

14. A host system as in claim 13 wherein the first transceiver performs the first handshaking in accordance with 1000 Base-X protocol.

15. A host system as in claim 13 wherein the first transceiver initiates the first handshaking by sending a receiver status signal to the host module.

16. A host system as in claim 13 wherein the first transceiver performs the second handshaking in accordance with 1000 Base-T protocol.

17. A host system as in claim 13 wherein the second handshaking further comprises the first transceiver sending to the second transceiver the true handshaking information about the first host system.

18. A host system as in claim 13 wherein said dummy handshaking information about the second host system is selected from the group consisting of FD (full duplex), HD (half duplex), PS1 (Pause), PS2 (ASM_DIR), and RF (remote fault) bits about the second host system.

19. A host system comprising:
- a host module means for acting as a network host; and
- a first transceiver means for performing first handshaking with the host module means in which the first transceiver means passes to the host module means dummy handshaking information about a second host system, wherein the host module means expects to receive true handshaking information about the second host system, but the first transceiver means not having the true handshaking information about the second host system sends the dummy handshaking information instead, the dummy handshaking information being information that is not the true handshaking information, the first transceiver means being for suspending the first handshaking after the first transceiver means obtains from the host module means true handshaking information about the first host system, the first transceiver means also being for performing second handshaking with a second transceiver within the second host system in which the first transceiver means obtains from the second transceiver the true handshaking information about the second host system, and the first transceiver means being for passing to the host module means the true handshaking information about the second host system, the true handshaking information replacing the dummy handshaking information passed from the first transceiver means to the host module means during the first handshaking.

20. A host system as in claim 19 wherein the first transceiver means is additionally for performing the first handshaking in accordance with 1000 Base-X protocol.

21. A host system as in claim 19 wherein the first transceiver means is additionally for initiating the first handshaking by sending a receiver status signal to the host module.

22. A host system as in claim 19 wherein the first transceiver means passes the true handshaking information to the host module during performance of second handshaking in accordance with 1000 Base-T protocol.

23. A host system as in claim 19 wherein the second handshaking further comprises the first transceiver sending to the second transceiver the true handshaking information about the first host system.

24. A host system as in claim 19 wherein said dummy handshaking information about the second host system is selected from the group consisting of FD (full duplex), HD (half duplex), PS1 (Pause), PS2 (ASM_DIR), and RF (remote fault) bits about the second host system.

* * * * *